United States Patent
Katsuki et al.

(10) Patent No.: US 11,704,542 B2
(45) Date of Patent: Jul. 18, 2023

(54) CONVOLUTIONAL DYNAMIC BOLTZMANN MACHINE FOR TEMPORAL EVENT SEQUENCE

(71) Applicant: INTERNATIONAL BUSINESS MACHINES CORPORATION, Armonk, NY (US)

(72) Inventors: Takayuki Katsuki, Tokyo (JP); Takayuki Osogami, Yamato (JP); Akira Koseki, Yokohama (JP); Masaki Ono, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1044 days.

(21) Appl. No.: 16/261,019

(22) Filed: Jan. 29, 2019

(65) Prior Publication Data

US 2020/0242446 A1   Jul. 30, 2020

(51) Int. Cl.
G06N 3/049 (2023.01)
G06F 17/15 (2006.01)
G06N 5/046 (2023.01)
G06N 3/047 (2023.01)

(52) U.S. Cl.
CPC .......... *G06N 3/049* (2013.01); *G06F 17/153* (2013.01); *G06N 3/047* (2023.01); *G06N 5/046* (2013.01)

(58) Field of Classification Search
CPC ...... G06N 3/049; G06N 3/0472; G06N 5/046; G06F 17/153
See application file for complete search history.

(56) References Cited

U.S. PATENT DOCUMENTS

2015/0071005 A1   3/2015   Maejima et al.
2018/0265128 A1*  9/2018   Mardh ............... B62D 6/007

FOREIGN PATENT DOCUMENTS

CN   107330908        11/2017
CN   107330908 A    * 11/2017

OTHER PUBLICATIONS

Kajino ("A Functional Dynamic Boltzmann Machine") Proceedings of the Twenty-Sixth International Joint Conference on Artificial Intelligence (IJCAI-17) (Year: 2017).*

Wang ("Temporal-related convolutional-Restricted-Boltzmann-Machine capable of learning relational order via reinforcement learning") Manuscript received Oct. 16, 2016 (Year: 2016).*

(Continued)

*Primary Examiner* — Kakali Chaki
*Assistant Examiner* — Su-Ting Chuang
(74) *Attorney, Agent, or Firm* — Tutunjian & Bitetto, P.C.; Randy Emilio Tejeda (57) ABSTRACT

A computer-implemented method is provided for machine prediction. The method includes forming, by a hardware processor, a Convolutional Dynamic Boltzmann Machine (C-DyBM) by extending a non-convolutional DyBM with a convolutional operation. The method further includes generating, by the hardware processor using the convolution operation of the C-DyBM, a prediction of a future event at time t from a past patch of time-series of observations. The method also includes performing, by the hardware processor, a physical action responsive to the prediction of the future event at time t.

16 Claims, 8 Drawing Sheets

(56) References Cited

OTHER PUBLICATIONS

Gao ("Collision Avoidance Control for Advanced Driver Assistance System Based on Deep Discriminant Model") AIPR 2018, Aug. 18-20, 2018, Beijing, China © 2018 Association for Computing Machinery (Year: 2018).*

Zhao ("Convolutional neural networks for time series classification") Journal of Systems Engineering and Electronics vol. 28, No. 1, Feb. 2017, pp. 162-169 (Year: 2017).*

Wiatowski ("Energy Propagation in Deep Convolutional Neural Networks") arXiv:1704.03636v3 [cs.IT] Feb. 1, 2018 (Year: 2018).*

Dhargalkar ("Determining Missing Values in Dimension Incomplete Databases using Spatial-Temporal Correlation Techniques") 2014 IEEE International Conference on Advanced Communication Control and Computing Technologies (ICACCCT) (Year: 2014).*

Katsuki ("Feature Extraction from Electronic Health Records of Diabetic Nephropathy Patients with Convolutioinal Autoencoder") The Workshops of the Thirty-Second AAAI Conference on Artificial Intelligence (Year: 2018).*

Datar_2007_The Sliding-Window Computation Model and Results 2007_Data streams Models and Algorithms (Year: 2007).*

Sohn ("Efficient learning of sparse, distributed, convolutional feature representations for object recognition") 2011 International Conference on Computer Vision (Year: 2011).*

Zeng ("Convolutional Neural Networks for human activity recognition using mobile sensors") 6th International Conference on Mobile Computing, Applications and Services (Year: 2014).*

Lockett et al., "Temporal Convolution Machines for Sequence Learning", Technical Report AI-09-04, semanticscholar.org, 2009, pp. 1-8.

Wang et al., "Temporal-Related Convolutional-Restricted-Boltzmann-Machine Capable of Learning Relational Order via Reinforcement Learning Procedure", arxiv.org, Oct. 16, 2016, pp. 1-8.

* cited by examiner

CONVOLUTIONAL DYNAMIC BOLTZMANN MACHINE FOR TEMPORAL EVENT SEQUENCE

BACKGROUND

Technical Field

The present invention generally relates to machine learning, and more particularly to a convolutional Dynamic Boltzmann Machine (DyBM) for a temporal event sequence.

Description of the Related Art

Currently, there are no good methods to apply to prediction problems involving temporal event sequences. A temporal event sequence is a set of records of an event with timestamps. As examples, lab results in Electronic Health Records (EHR), computer performance traces, and so forth, can involve a temporal event sequence.

For modeling a temporal event sequence, there are some technical hurdles compared to ordinary time-series data. For example, some of these technical hurdles include, but are not limited to: the time intervals being different from each other; and all of the attributes are not always observed. The hurdles require time-shift invariance and robustness against missing values.

Although variants of CNNs can satisfy the above requirements, they do not have the desirable capabilities of time-series models. For example, the achieved modeling is often redundant in the way it models temporal sequence data. Also, such variants cannot handle sequences with infinite length. Accordingly, there is a need for an improved prediction model for temporal event sequences.

SUMMARY

According to an aspect of the present invention, a computer-implemented method is provided for machine prediction. The method includes forming, by a hardware processor, a Convolutional Dynamic Boltzmann Machine (C-DyBM) by extending a non-convolutional DyBM with a convolutional operation. The method further includes generating, by the hardware processor using the convolution operation of the C-DyBM, a prediction of a future event at time t from a past patch of time-series of observations. The method also includes performing, by the hardware processor, a physical action responsive to the prediction of the future event at time t.

According to another aspect of the present invention, a computer program product is provided for machine prediction. The computer program product includes a non-transitory computer readable storage medium having program instructions embodied therewith, the program instructions executable by a computer to cause the computer to perform a method. The method includes forming, by a hardware processor, a Convolutional Dynamic Boltzmann Machine (C-DyBM) by extending a non-convolutional DyBM with a convolutional operation. The method further includes generating, by the hardware processor using the convolution operation of the C-DyBM, a prediction of a future event at time t from a past patch of time-series of observations. The method also includes performing, by the hardware processor, a physical action responsive to the prediction of the future event at time t.

According to yet another aspect of the present invention, a computer processing system is provided for machine prediction. The computer processing system includes a memory for storing program code. The computer processing system further includes a processor for running the program code to form a Convolutional Dynamic Boltzmann Machine (C-DyBM) by extending a non-convolutional DyBM with a convolutional operation. The processor further runs the program code to generate, using the convolution operation of the C-DyBM, a prediction of a future event at time t from a past patch of time-series of observations. The processor also runs the program code to perform a physical action responsive to the prediction of the future event at time t.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a convolutional Dynamic Boltzmann Machine (DyBM) for a temporal event sequence.

In an embodiment, a convolutional structure is incorporated into a time-series model DyBM. In an embodiment, the present invention is deployed in a problem setting as follows: predict objective variables y from past temporal sequences of events X ($\theta$: model parameters). In an embodiment, y can be a future event itself (autoregression) or any other unobservable variable in the future (regression or classification) such that:

$$\hat{y}[t] = f(X^{[t<t]}, \hat{\theta}),$$

where
X are past temporal sequences of events,
y is a future event, and
θ are model parameters.

Figure 1:
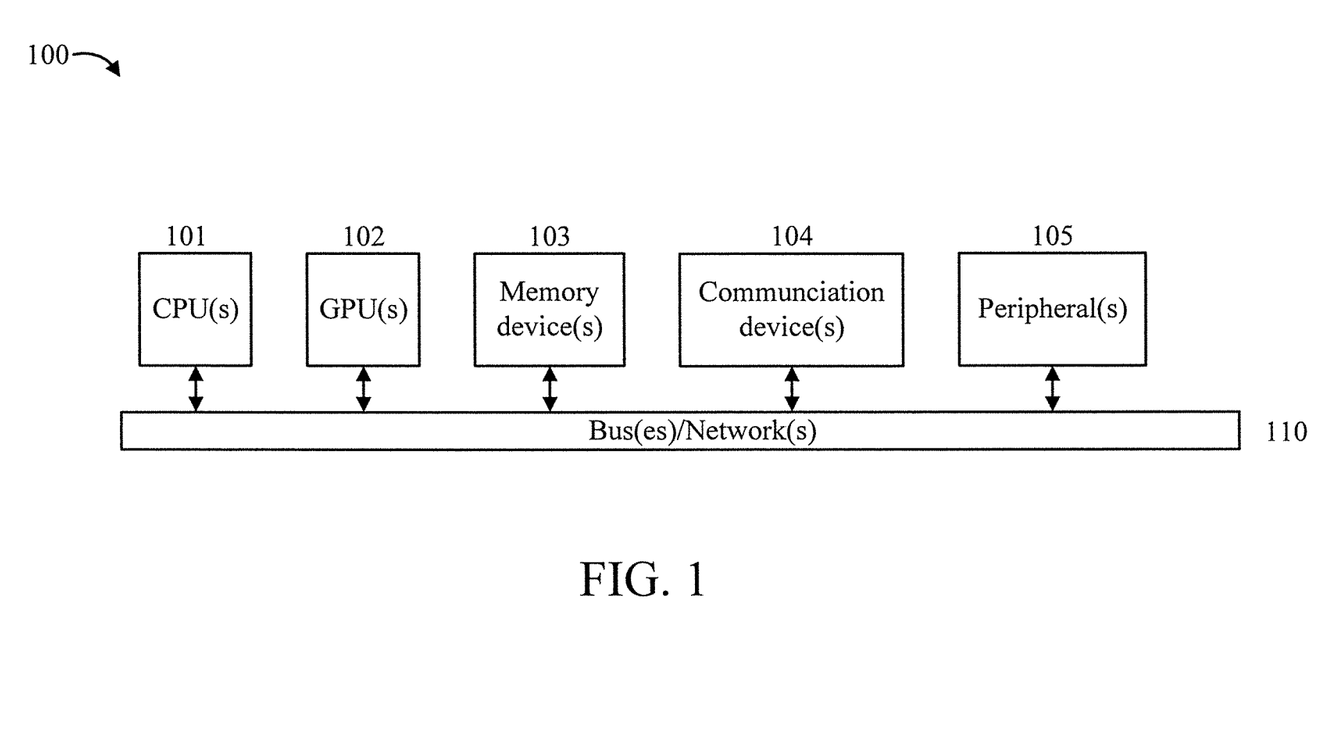
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various elements of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description of DyBM operation will now be given, in accordance with an embodiment of the present invention. As noted here, a DyBM is extended for purposes of the present invention to include dynamical convolution structures.

A dynamic Boltzmann machine (DyBM) can be implemented as a model of an artificial recurrent neural network that can be trained via spike-timing dependent plasticity (STDP), a learning rule postulated and experimentally confirmed for biological neural networks. More specifically, parameters such as weights and biases of a DyBM can be optimized via this learning rule in a way that the likelihood of given time-series data is maximized (i.e., that time-series data is most likely to be generated according to the probability distributions defined by the DyBM with the optimized parameters). A DyBM also has hyperparameters that need to be tuned. These hyperparameters can include, for example, the decay-rates of eligibility traces and the lengths of first-in-first-out (FIFO) queues.

In an embodiment, a DyBM that is extended for purposes of the present invention includes a neuron connected to another neuron via a first-in-first-out (FIFO) queue. The former neuron is called pre-synaptic, and the latter post-synaptic. Note that each neuron can be called pre-synaptic or post-synaptic, depending on the connection under consideration. At each step t, a pre-synaptic neuron i fires or not, and this binary information $x_i^{[t]}$ travels along the FIFO queue and then reaches the synapse. This interval between when neuron i fires a spike and when that spike reaches the synapse connected to neuron j is referred to as the conduction delay $d_{ij}$ from i to j. The synapse stores and continues to update the value of a quantity called a synaptic eligibility trace, whose value decays with rate λ at each step but increases by one when a spike ($x_i^{[t]}=1$) reaches the synapse. The present invention extends the summation and definition of the eligibility trace in a DyBM to the 1D-convolutional operation in our model.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes a prediction system operatively coupled to a controlled system, while the environment 300 includes a prediction system as part of a controlled system. Moreover, any of environments 200 and 300 can be part of a cloud-based environment (e.g., see FIGS. 7-8). These and other environments to which the present invention can be applied are readily determined by one of ordinary skill in the art, given the teachings of the present invention provided herein, while maintaining the spirit of the present invention.

Figure 2:
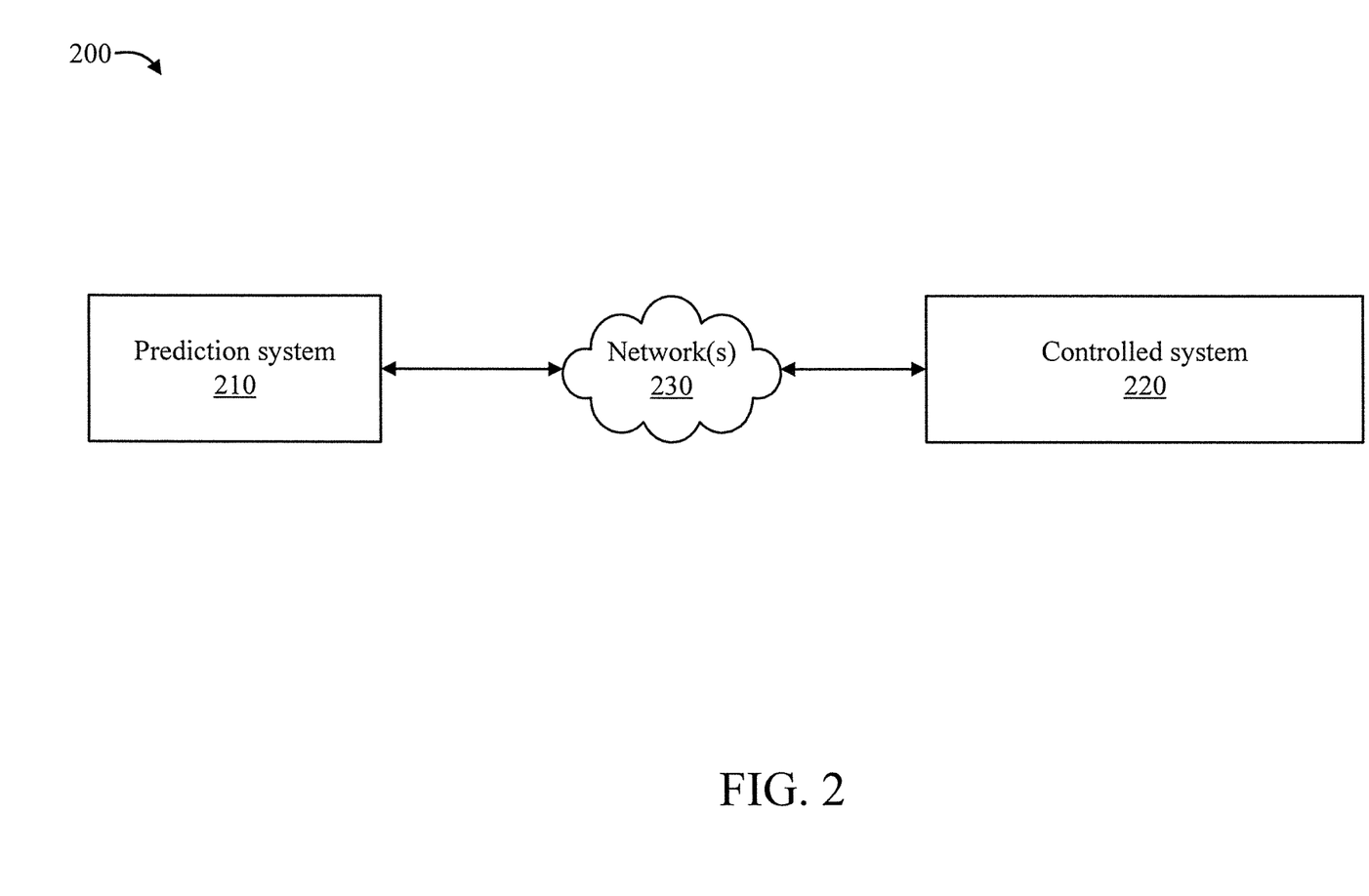
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes a prediction system 210 and a controlled system 220. The prediction system 210 and the controlled system 220 are configured to enable communications therebetween. For example, transceivers and/or other types of communication devices including wireless, wired, and combinations thereof can be used. In an embodiment, communication between the prediction system 210 and the controlled system 220 can be performed over one or more networks, collectively denoted by the figure reference numeral 230. The communication can include, but is not limited to, sequence data from the controlled system 220, and predictions and action initiation control signals from the prediction system 210. The controlled system 220 can be any type of processor-based system such as, for example, but not limited to, a banking system, an access system, a surveillance system, a manufacturing system (e.g., an assembly line), an Advanced Driver-Assistance System (ADAS), and so forth.

The controlled system 220 provides data (e.g., sequence data) to the prediction system 210 which uses the data to make predictions.

The controlled system 220 can be controlled based on a prediction generated by the prediction system 210. For example, based on a prediction that a machine will fail in x time steps, a corresponding action (e.g., power down machine, enable machine safeguard to prevent injury/etc., and/or so forth) can be performed at t<x in order to avoid the failure from actually occurring. As another example, based on a trajectory of an intruder, a surveillance system being controlled could lock or unlock one or more doors in order to secure someone in a certain place (holding area) and/or guide them to a safe place (safe room) and/or restrict them from a restricted place and/or so forth. Verbal (from a speaker) or displayed (on a display device) instructions could be provided along with the locking and/or unlocking of doors (or other actions) in order to guide a person. As a further example, a vehicle can be controlled (braking, steering, accelerating, and so forth) to avoid an obstacle that is predicted to be in a car's way responsive to a forecast. As a yet further example, the present invention can be incorporated into a computer system in order to forecast impending failures and take action before the failures occur, such as switching a component that will soon fail with another component, routing through a different component, processing by a different component, and so forth. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the prediction system 210 can be implemented as a node in a cloud-computing arrangement. In an embodiment, a single prediction system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
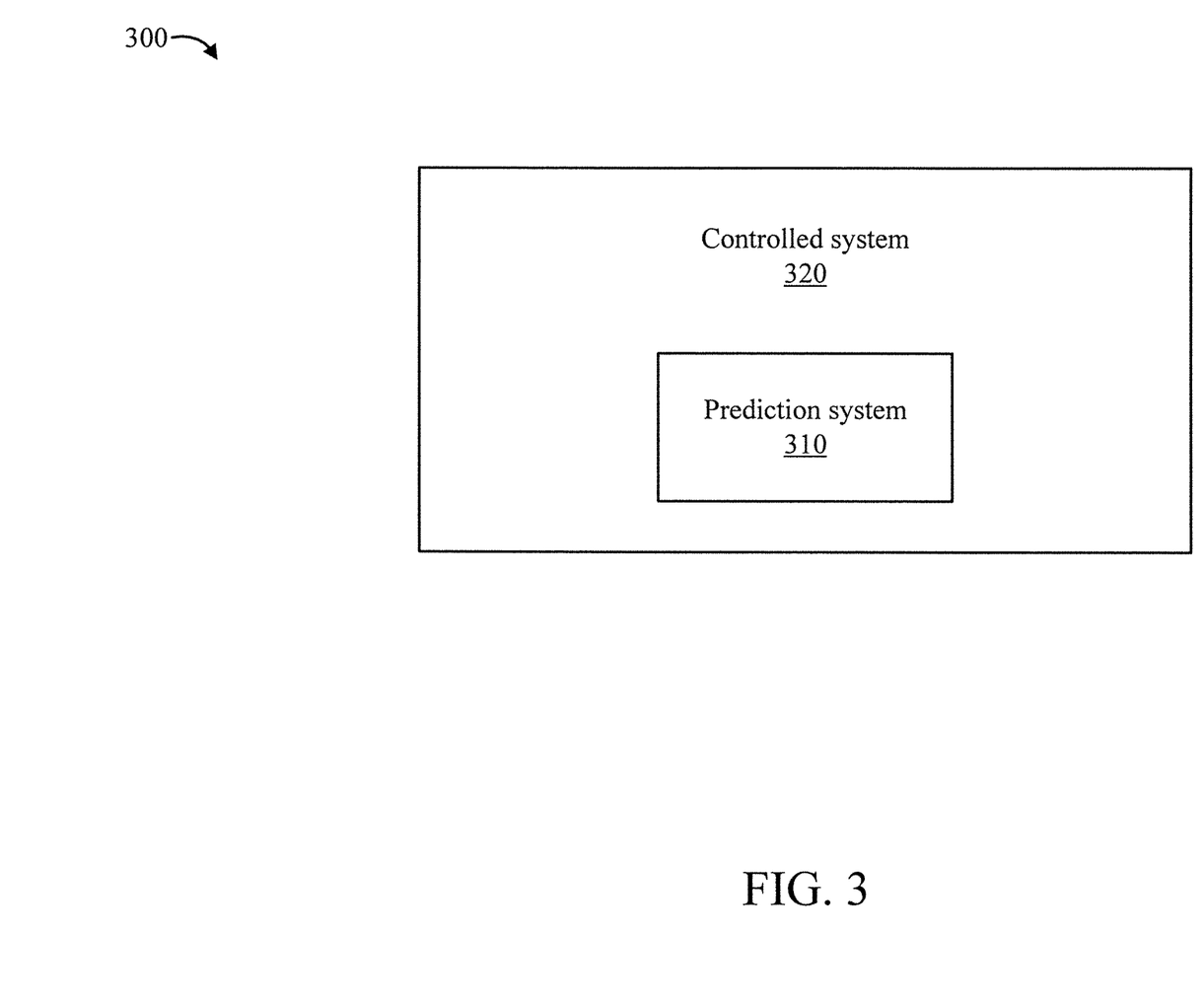
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes a prediction system 310. One or more communication buses and/or other devices can be used to facilitate inter-system, as well as intra-system, communication. The controlled system 320 can be any type of processor-based system such as, for example, but not limited to, a banking system, an access system, a surveillance system, a manufacturing system (e.g., an assembly line), an Advanced Driver-Assistance System (ADAS), and so forth.

Other than system 310 being included in system 320, operations of these elements in environments 300 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

In an embodiment, the following prediction model can be used:

$$[f(X^{[<t]}, \theta)]_j = h(\{\sum_i \sum_{\tau_k=0}^{T_k} x_i^{[t-d-\tau_k]} W_{k,i,j}^{[d,\tau_k]} - b_k\}_{1 \leq k \leq K, 1 \leq d \leq T})$$

where $W_{k,i,j}^{[d,\tau_k]}$ is a convolutional parameter of a k-th convolutional map across time with $\tau_k$ for the i-th attribute value $x_i^{[t-d]}$ at time t−d, where we use one (i.e., (1) or (2)) of the following definitions of $W_{k,i,j}^{[d,\tau_k]}$ in the k-th convolutional map:

(1) $W_{k,i,j}^{[d,\tau_k]} = \lambda^{d+\tau_k} U_{k,i,j}$, and (2) $W_{k,i,j}^{[d,\tau_k]} = \mu^d V_{k,\tau_k,i,j}$, e.g., we can use same proportion in our K number of convolutional patches, and where $X^{[<t]} \equiv \{x^{[t-d]}\}_{d=t-T}^{t-1}$ is past observations occurring before the time t, U, V, and b are the model parameters for K number of convolutional maps, $\lambda$ and $\mu$ are decay rates, T is a length of the past observations, and $T_k$ is a width of a patch of a k-th convolutional map.

The prediction model extends a DyBM with dynamical convolutional structures to provide a convolutional DyBM (C-DyBM). By using a convolution operation, the future can be predicted from a past patch but not a point.

Figure 4:
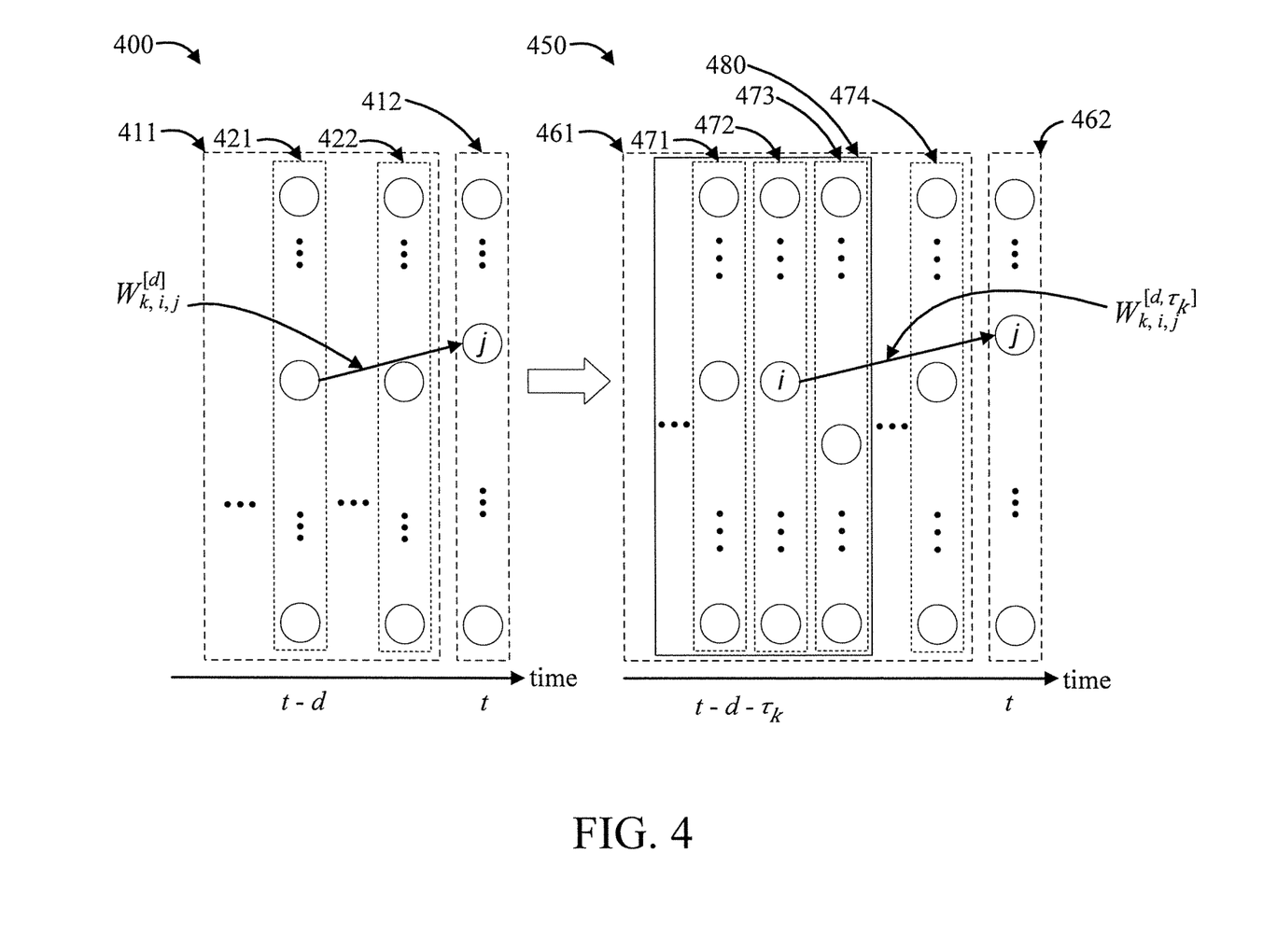
FIG. 4 shows a Dynamic Boltzmann Machine (DyBM) modified into a Convolutional Dynamic Boltzmann Machine (C-DyBM), in accordance with an embodiment of the present invention.

FIG. 4 shows a Dynamic Boltzmann Machine (DyBM) 400 modified into a Convolutional Dynamic Boltzmann Machine (C-DyBM) 450, in accordance with an embodiment of the present invention. DyBM predicts the future event at time t 412 by taking the weighted sum of the past observations $X^{[<t]} \equiv \{X^{[t-d]}\}_{d=t-T}^{t-1}$ occurring before the time t 411 including the observation $x_i^{[t-1]}$ at time t−1 422 and the observation $x_i^{[t-d]}$ at time t−d 421, where the weight for the observation $x_i^{[t-d]}$ at time t−d 421 is $W_{k,i,j}^{[d]}$. C-DyBM 450 predicts the future event at time t 462 by taking the weighted sum of the patches of the past observations $X^{[<t]} \equiv \{x^{[t-d]}\}_{d=t-T}^{t-1}$ occurring before the time t 461 including the patch at time t−d−$\tau_k$ 480, which includes the observations $x_i^{[t-d-\tau_k-1]}$ at time t−d−$\tau_k$−1 471, $x_i^{[t-d-\tau_k]}$ at time t−d−$\tau_k$ 472, and $x_i^{[t-d-\tau_k+1]}$ at time t−d−$\tau_k$+1 473, where the weights for the observations $x_i^{[t-d-\tau_k-1]}$ 471, $x_i^{[t-d-\tau_k]}$ 472, and $x_i^{[t-d-\tau_k+1]}$ 473 in the patch at time t−d 480 are $W_{k,i,j}^{[d,\tau_k-1]}$, $W_{k,i,j}^{[d,\tau_k]}$, and $W_{k,i,j}^{[d,\tau_k+1]}$, respectively.

In an embodiment, the dynamical convolutional structures used to extend the DyBM 400 into the C-DyBM 450 extend the summation and definition of the eligibility trace in DyBM to the 1D-convolutional operation in our model. The C-DyBM 450 has a convolutional structure across time, where the weight of a convolutional patch decays exponentially at each time point.

In an embodiment, the following pooling method can be used: dynamic pooling.

In an embodiment, dynamic pooling in accordance with the present invention can involve: dynamically down-sample the latent representations by taking the maximum value over sub-temporal regions, while increasing window size exponentially. Dynamic pooling leads to tractable analysis for the missing values by ignoring them in this max operation, and enables handling infinite sequences and sequences with different lengths when the final window size is made approximately as infinity.

Figure 5:
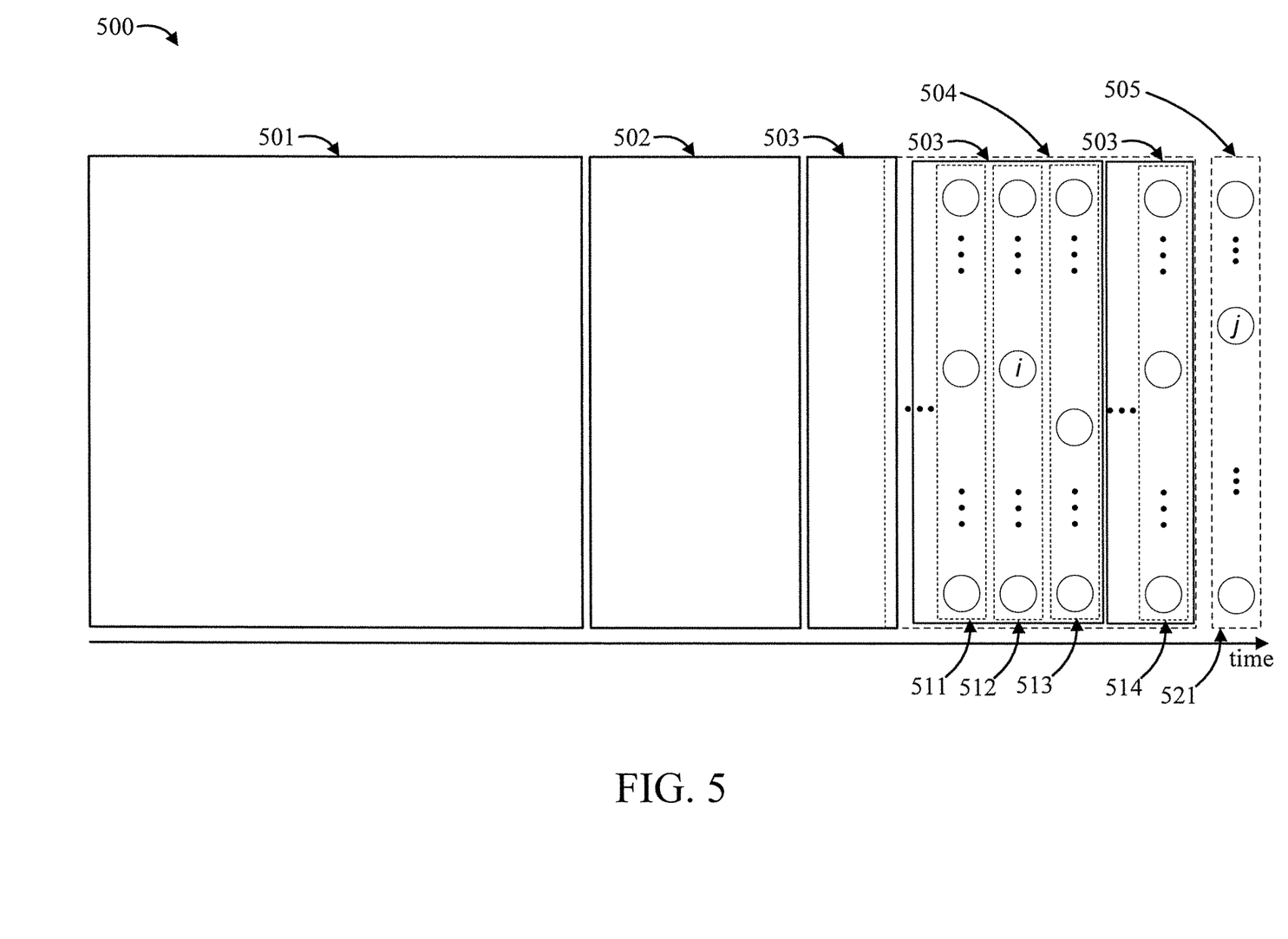
FIG. 5 shows an exemplary dynamic pooling operation, in accordance with an embodiment of the present invention.

FIG. 5 shows an exemplary dynamic pooling operation 500, in accordance with an embodiment of the present invention. The dynamic pooling operation 500 dynamically down samples the observations or latent representations for preprocessing of the C-DyBM prediction for the future event 521 by taking the maximum value over sub-temporal regions, e.g., 511, 512, and 512 in the patch 504, along with increasing the window size exponentially, and using the down-sampled observations or latent representations as the inputs for the C-DyBM prediction. The pooling window increases in accordance with the time from prediction point t as 503, 502, and 501.

The dynamic pooling operation 500 can be implemented by the following:

$$z_i^{[t]} = \max_{\tau_k \in [0, l_0 \times l^t]} \left( x_i^{[t-\tau_k]} \right)$$

where $l_0$ is the initial window size, and $l$ is the growth rate of the window.

A description will now be given regarding parameter updates rules, in accordance with various embodiments of the present invention. The following variant of Stochastic Gradient Descent (SGD) can be used to update the parameter rules:

$$\theta \leftarrow \theta + \eta \frac{1}{M} \sum_{m=t-M+1}^{t} \frac{\partial \mathcal{L}^{[m]}(\theta)}{\partial \theta}.$$

The following parameter update rule can be used for predicting real value:

$$\mathcal{L}^{[t]}(\theta) = \|X_i^{[t]} - [f(X^{[<t]}, \theta)]_i\|^2.$$

The following parameter update rule can be used for predicting discrete value:

$$\mathcal{L}^{[t]}(\theta) = L_c(y^{[t]}, \sigma(f(X^{[t<]}, \theta))).$$

The loss function $L_c$ can be selected for each task from mean squared error, cross entropy, log likelihood, and other functions. $\sigma$ can be a softmax function.

Figure 6:
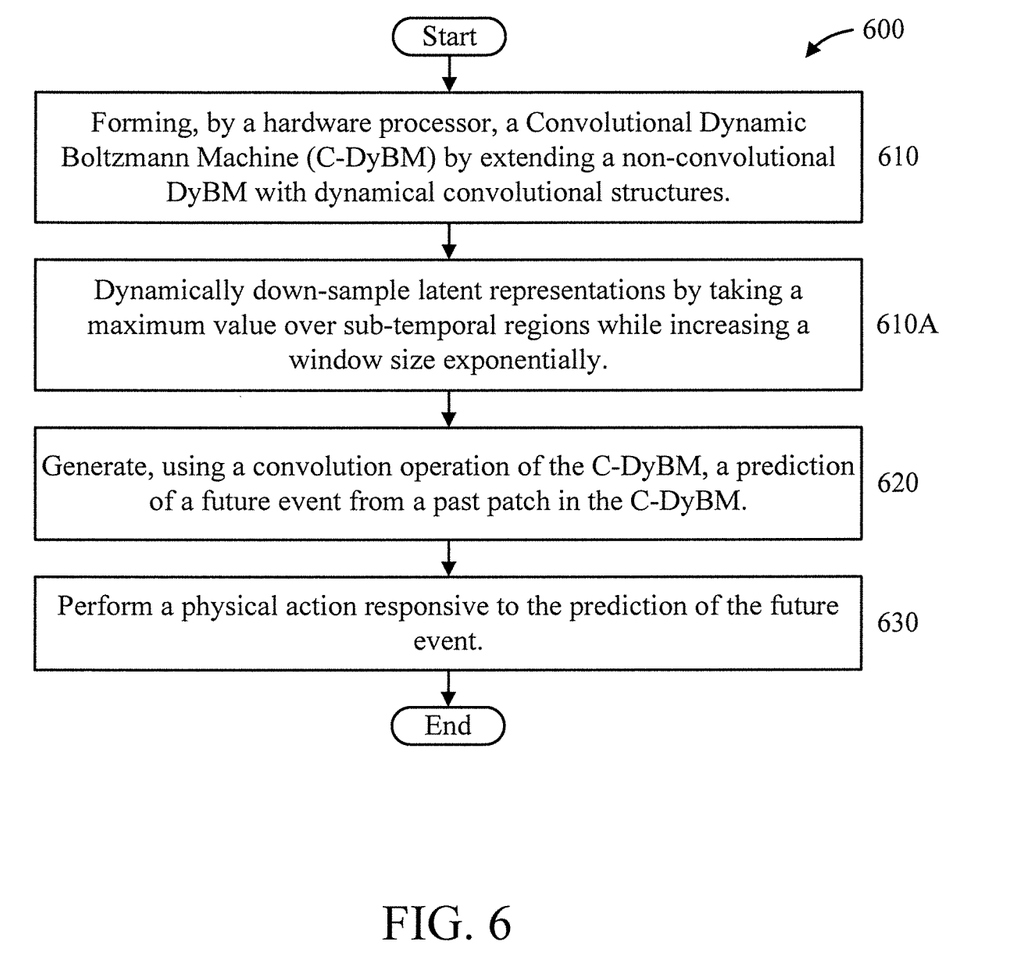
FIG. 6 is a flow diagram showing an exemplary method for generating a prediction from a temporal event sequence using a Convolutional Boltzmann Machine (C-DyBM), in accordance with an embodiment of the present invention.

FIG. 6 is a flow diagram showing an exemplary method for generating a prediction from a temporal event sequence using a Convolutional Boltzmann Machine (C-DyBM), in accordance with an embodiment of the present invention.

At block 610, forming, by a hardware processor, a Convolutional Dynamic Boltzmann Machine (C-DyBM) by extending a non-convolutional DyBM with dynamical convolutional structures.

In an embodiment, the C-DyBM can be implemented as follows:

$$[f(X^{[<t]},\theta)]_j = h(\{\Sigma_i \Sigma_{\tau_k=0}^{T_k} x_i^{[t-d-\tau_k]} W_{k,i,j}^{[d,\tau_k]} - b_k\}_{1 \le k \le K, 1 \le d \le T}),$$

where $W_{k,i,j}^{[d,\tau_k]}$ is a convolutional parameter of a k-th convolutional map across time with $\tau_k$ for the i-th attribute value $x_i^{[t-d]}$ at time t–d, where we use one of the following definitions of $W_{k,i,j}^{[d,\tau_k]}$ in the k-th convolutional map:

(1) $W_{k,i,j}^{[d,\tau_k]} = \lambda^{d+\tau_k} U_{k,i,j}$ and (2) $W_{k,i,j}^{[d,\tau_k]} = u^d V_{k,\tau_k,i,j}$, e.g., we can use same proportion in our K number of convolutional patches, and where $X^{[<t]} \equiv \{x^{[t-d]}\}_{d=t-T}^{t-1}$ is past observations occurring before the time t, U, V, and b are the model parameters for K number of convolutional maps, $\lambda$ and $\mu$ are decay rates, T is a length of the past observations, and $T_k$ is a width of a patch of a k-th convolutional map.

In an embodiment, block 610 can include block 610A.

At block 610A, dynamically down-sample latent representations by taking a maximum value over sub-temporal regions while increasing a window size exponentially.

In an embodiment, the down-sampling can be performed as follows;

$$z_i^{[t]} = \max_{\tau_k \in [0, l_0 \times l^t]} \left(x_i^{[t-\tau_k]}\right)$$

where $l_0$ is the initial window size and $l$ is the growth rate of the window.

In an embodiment, missing sequence values are ignored by the dynamically down-sampling. In an embodiment, the sub-temporal regions are of varying lengths. In an embodiment, the window size it ultimately increased to infinity.

At block 620, generate, using a convolution operation of the C-DyBM, a prediction of a future event from a past patch in the C-DyBM.

At block 630, perform a physical action responsive to the prediction of the future event.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
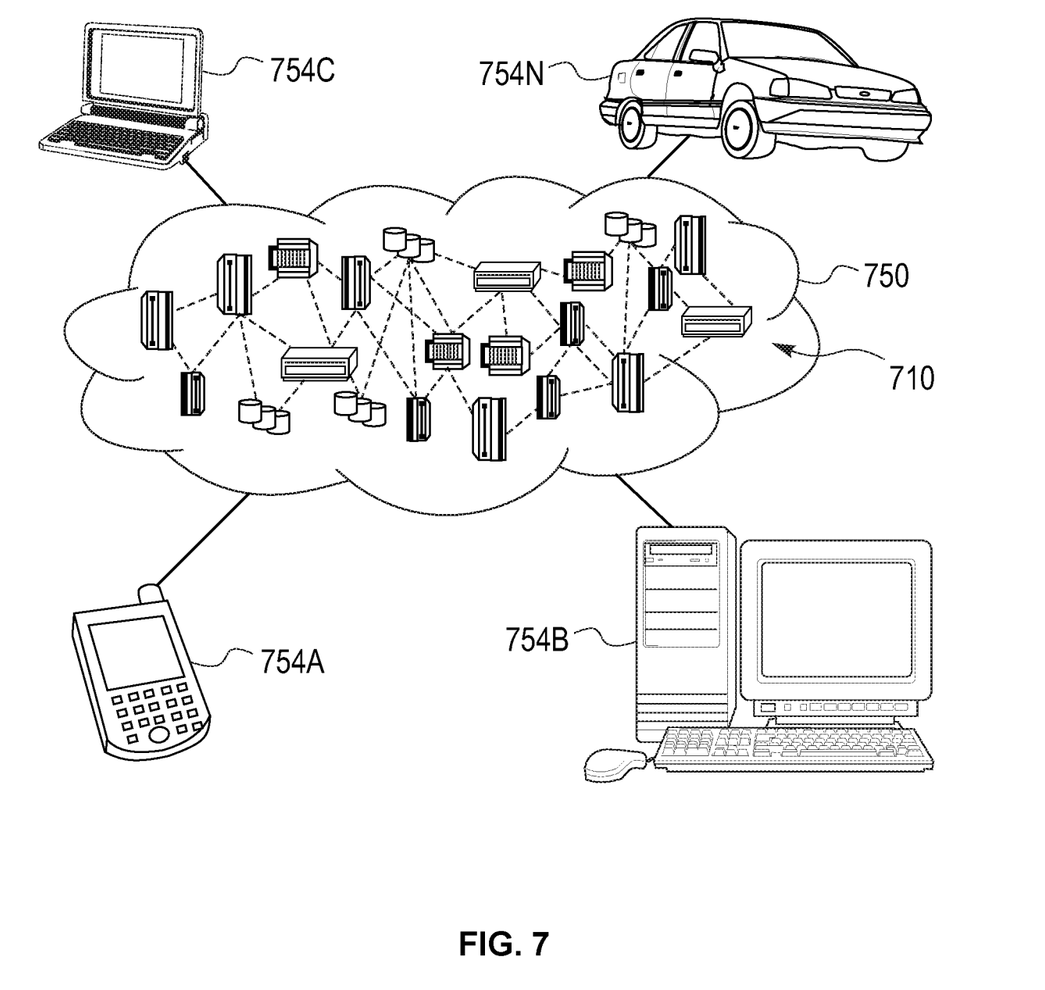
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
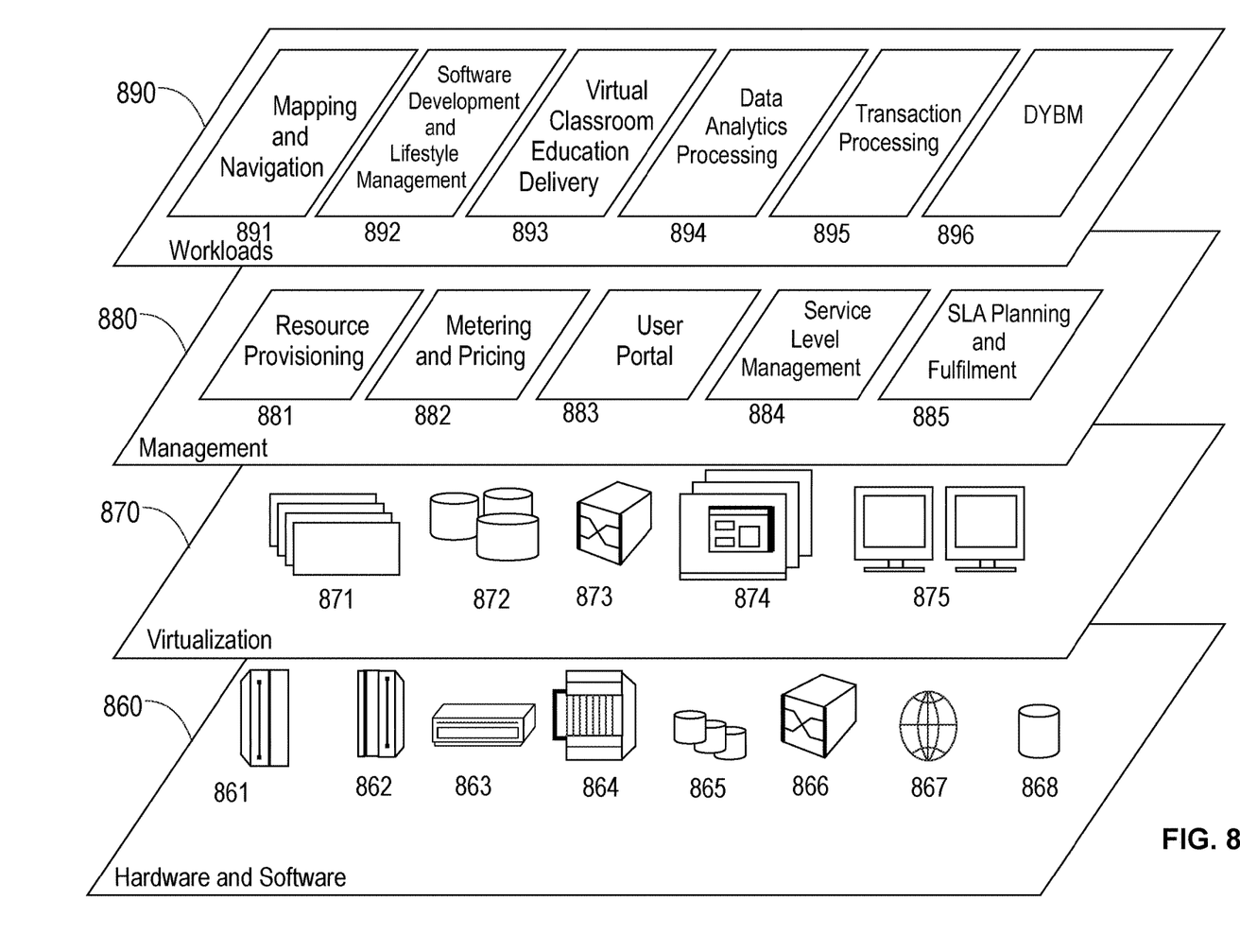
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and prediction using DyBM 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for machine prediction, comprising:
    forming, by a hardware processor, a Convolutional Dynamic Boltzmann Machine (C-DyBM) by extending a non-convolutional DyBM with a convolutional operation;
    generating, by the hardware processor using the convolution operation of the C-DyBM, a prediction of a future event at time t from a past patch of time-series of observations; and
    performing, by the hardware processor, a physical action responsive to the prediction of the future event at time t,
    wherein the physical action comprises avoiding an obstacle by automatically controlling one or more driving related functions of a vehicle, responsive to the prediction of the future event at time t being a collision with the obstacle based on a current trajectory of the vehicle, and
    wherein the forming step comprises dynamically down-sampling any of observations and latent representations using a down-sampling function that takes a maximum value over sub-temporal regions along with increasing a window size exponentially.

2. The computer-implemented method of claim 1, the down-sampling function being $$z_i^{[t]} = \max_{\tau_k \in [0, l_0 \times l^t]} \left( x_i^{[t-\tau_k]} \right),$$

wherein $l_0$ is an initial size of the window, and l is a growth rate of the window.

3. The computer-implemented method of claim 2, wherein missing sequence values are ignored by the dynamically down-sampling.

4. The computer-implemented method of claim 2, wherein the sub-temporal regions are of varying lengths.

5. The computer-implemented method of claim 2, wherein the window size for the earliest sub-temporal region is infinity.

6. The computer-implemented method of claim 1, wherein the convolutional operation with which the DyBM is extended as a one-dimensional convolutional operation.

7. The computer-implemented method of claim 6, wherein the one-dimensional convolutional operation extends a summation of an eligibility trace in the C-DyBM.

8. A computer program product for machine prediction, the computer program product comprising a non-transitory computer readable storage medium having program instructions embodied therewith, the program instructions executable by a computer to cause the computer to perform a method comprising:
    forming, by a hardware processor, a Convolutional Dynamic Boltzmann Machine (C-DyBM) by extending a non-convolutional DyBM with a convolutional operation;
    generating, by the hardware processor using the convolution operation of the C-DyBM, a prediction of a future event at time t from a past patch of time-series of observations; and
    performing, by the hardware processor, a physical action responsive to the prediction of the future event at time t,
    wherein the physical action comprises avoiding an obstacle by automatically controlling one or more driving related functions of a vehicle, responsive to the prediction of the future event at time t being a collision with the obstacle based on a current trajectory of the vehicle, and
    wherein the forming step comprises dynamically down-sampling any of observations and latent representations using a down-sampling function that takes a maximum value over sub-temporal regions along with increasing a window size exponentially.

9. The computer program product of claim 8, the down-sampling function being $$z_i^{[t]} = \max_{\tau_k \in [0, l_0 \times l^t]} \left( x_i^{[t-\tau_k]} \right),$$

wherein $l_0$ is an initial size of the window, and l is a growth rate of the window.

10. The computer program product of claim 9, wherein missing sequence values are ignored by the dynamically down-sampling.

11. The computer program product of claim 9, wherein the sub-temporal regions are of varying lengths.

12. The computer program product of claim 9, wherein the window size for the earliest sub-temporal region is infinity.

13. The computer program product of claim 8, wherein the convolutional operation with which the DyBM is extended as a one-dimensional convolutional operation.

14. The computer program product of claim 13, wherein the one-dimensional convolutional operation extends a summation of an eligibility trace in the C-DyBM.

15. A computer processing system for machine prediction, comprising:
    a memory for storing program code; and
    a processor for running the program code to
        form a Convolutional Dynamic Boltzmann Machine (C-DyBM) by extending a non-convolutional DyBM with a convolutional operation;
        generate, using the convolution operation of the C-DyBM, a prediction of a future event at time t from a past patch of time-series of observations; and
        perform a physical action responsive to the prediction of the future event at time t,
        wherein the physical action comprises avoiding an obstacle by automatically controlling one or more driving related functions of a vehicle, responsive to the prediction of the future event at time t being a collision with the obstacle based on a current trajectory of the vehicle, and
        wherein the forming step comprises dynamically down-sampling any of observations and latent representations using a down-sampling function that takes a maximum value over sub-temporal regions along with increasing a window size exponentially.

16. The computer program product of claim 15, wherein the convolutional operation with which the DyBM is extended as a one-dimensional convolutional operation.

* * * * *